United States Patent

Reader et al.

[15] 3,647,955

[45] Mar. 7, 1972

[54] IMAGE TRANSMITTER USING MICROFILM POSITIVES OR NEGATIVES AS SOURCE

[72] Inventors: Malcolm Reader, New Hyde Park, L. I., N.Y.; John L. Tregay, Weston, Conn.; Charles Stern, Brooklyn, N.Y.

[73] Assignee: Comfax Communications Industries, Inc., New York, N.Y.

[22] Filed: May 4, 1970

[21] Appl. No.: 34,334

[52] U.S. Cl. ..........................178/7.6, 178/DIG. 28, 355/20

[51] Int. Cl. ..........................H04n 3/08

[58] Field of Search ..........................178/7.6, 7.85, 7.88, 7.89, 178/6.8, DIG. 28, 7.7; 355/8, 41, 43, 45, 49, 51, 57, 60, 66, 81, 84, 20; 346/110

[56] References Cited

UNITED STATES PATENTS

| | | | |
|---|---|---|---|
| 2,670,665 | 3/1954 | Caldwell | 178/7.6 |
| 2,779,819 | 1/1957 | Graham | 178/7.2 D |
| 2,478,555 | 8/1949 | Yule | 178/7.6 |
| 3,415,951 | 12/1968 | Heller | 178/7.89 |
| 3,481,670 | 12/1969 | Amemiya | 355/66 |

FOREIGN PATENTS OR APPLICATIONS

| | | | |
|---|---|---|---|
| 521,154 | 5/1940 | Great Britain | 178/7.2 D |

*Primary Examiner*—Robert L. Griffin
*Assistant Examiner*—Joseph A. Orsino, Jr.
*Attorney*—Sandoe, Hopgood and Calimafde

[57] ABSTRACT

An image transmission system is disclosed in which the image is obtained from a reduced size medium such as microfilm. A scanning beam is incident upon a first reflector which causes the beam to be redirected onto a second reflector fixedly spaced therefrom. The second reflector in turn redirects the scanning beam onto the film. By moving the two reflectors with respect to the source of the scanning beam by a relatively large distance, the scanning beam is moved by a much smaller distance over the plane of the film, to permit scanning over a new line on the film.

7 Claims, 8 Drawing Figures

Patented March 7 1972

3,647,955

3 Sheets-Sheet 1

INVENTORS
MALCOLM READER
JOHN L. TREGAY
CHARLES STERN

BY

Sandoe, Hopgood & Calimafde

ATTORNEYS

INVENTORS
MALCOLM READER
JOHN L. TREGAY
CHARLES STERN
BY
Sandoe, Hopgood & Calimafde
ATTORNEYS INVENTORS
MALCOLM READER
JOHN L. TREGAY
CHARLES STERN
BY
Sandoe Hopgood & Calimafde
ATTORNEYS

IMAGE TRANSMITTER USING MICROFILM POSITIVES OR NEGATIVES AS SOURCE

The present invention relates generally to image transmission systems, and more particularly to a system for transmitting images obtained from reduced sized image-carrying medium such as microfilm, or the like.

In a conventional image transmission system, such as in a facsimile transmitter, a document or image is scanned such as by a cathode-ray beam, and the reflected image is processed and converted into equivalent electrical signals for transmission to a receiver. The subject matter on the document which is commonly in the form of printed words, pictures or the like, is usually sufficiently large in size to permit adequate scanning resolution by a beam having the spot size produced by available cathode-ray tubes.

In an attempt to conserve valuable storage space, an increasing amount of information is currently being reproduced in reduced size form such as on microfilm or the like. In the conventional use of microfilm, the film is viewed in an enlarger which restores the image to its original size. It is, however, often desirable to transmit information stored on microfilm to a remote location without the need for first enlarging the image.

However, as a result of the small size of microfilm, the resolution of the subject matter thereon is too small to permit scanning by a cathode-ray beam for the reason that the spot size (diameter) of the beam exceeds the desired interlinear resolution of the image on the film. That is, the spot diameter exceeds the spacing between adjacent scanning lines on the film required to achieve satisfactory resolution in the reproduced copy.

Microfilm image transmitters have been proposed in which scanning is achieved by incrementally moving the film holder by means of a mechanical arrangement while maintaining the scanning beam in a fixed position. This arrangement is, however, a complex one and does not provide sufficiently fine image resolution for most applications. In another proposed image transmitter the scanning beam is obtained by collimating a laser beam. The collimated beam is moved over the image surface by the operation of two prisms which are rotated about mutually perpendicular axes. While the latter system provides improved image resolution, its increased cost and complexity has limited its acceptance and usefulness. Thus, there remains a need in the field of microfilm image transmission for a less complex and less costly system which still provides the necessary fine resolution. With the increased use of microfilm for information storing purposes, the need for such a system is becoming more apparent.

It is an object of the present invention to provide a practical image transmitter in which the image is obtained from a reduced-size medium such as microfilm.

It is a further object of the invention to provide an image transmission system for producing precise control over the position of a scanning beam over the image-carrying medium.

It is another object of the invention to provide an image transmission system in which means are provided to precisely position a scanning beam in response to relatively gross motion.

It is a more general object of the invention to provide a low-cost and relatively simple microfilm scanner and transmitter which provides fine resolution.

It is another object of the invention to provide a microfilm scanner and transmitter which permits image transmission from a microfilm at high reduction ratios and with fine resolution in which the film and object lens remain stationary.

It is still another object of the present invention to provide a microfilm scanner and transmitter in which the film may be either a negative or positive image, and in which scanning may be performed in both directions.

To these ends the image transmitter of the present invention provides an improved means for scanning a beam over the surface of a reduced sized medium such as microfilm by the use of an optical system including first and second reflecting means positioned at a fixed distance from one another. The scanning beam is incident on the first reflecting means from which it is then reflected onto the second reflecting means. The latter in turn reflects the beam onto the image plane of the film. Gross relative movement of the reflecting means causes the point of incidence of the beam on the film to be varied to a much smaller extent.

In the embodiment of the invention herein described, once the beam has completed scanning across one line of the film, the first and second reflecting means are slightly, incrementally moved to a new position, to thereby reposition the beam for scanning over the immediately adjacent line.

The precise control of the scanning beam position achieved in the system of the invention permits the scanning of a reduced size image medium such as a microfilm with high linear resolution, even though the spot size of the initial scanning beam exceeds the spacing between adjacent lines of scanning.

To the accomplishment of the above and to such further objects as may hereinafter appear, the present invention relates to an image transmitter substantially as defined in the appended claims, taken together with the accompanying drawings, in which:

The image transmitter of the invention is particularly well suited for the transmission of information derived from a reduced size medium such as a microfilm positive or negative. As is well known, information, which may be either in printed or graphic form, is commonly reproduced in a highly reduced form on microfilm for greater ease in storage. The image transmitter of the present invention enables the scanning of the microfilm, for purposes of transmitting the image on the film to a remote receiver.

Figure 1:
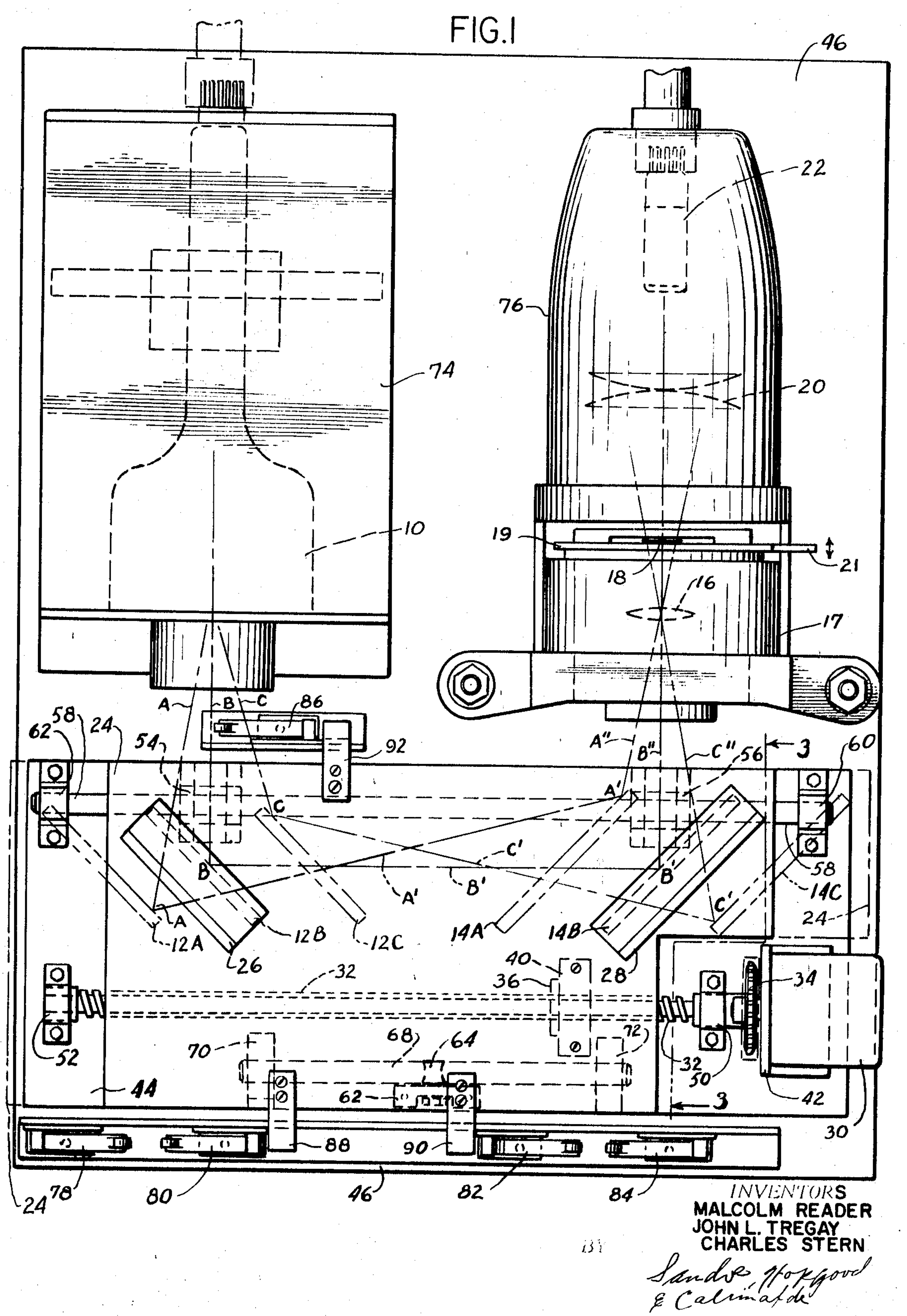
FIG. 1 is a top plan view of the image transmitter of the invention illustrating the beam directing portion of the transmitter in schematic form.
Figure 2:
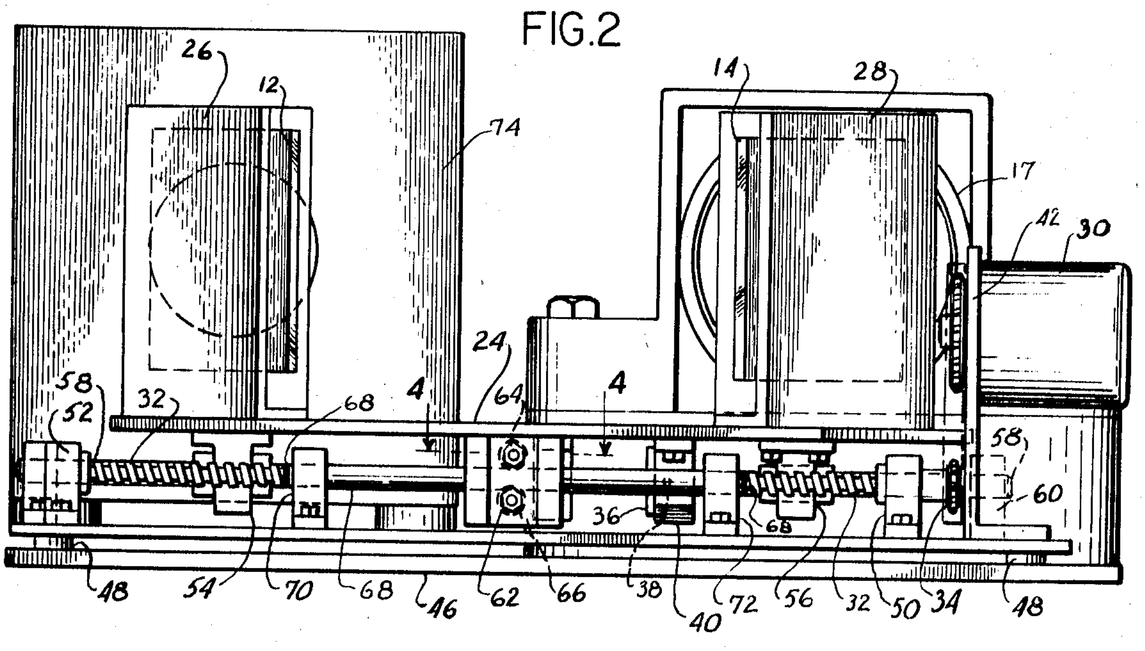
FIG. 2 is a front elevation of the image transmitter of the invention.
Figure 3:
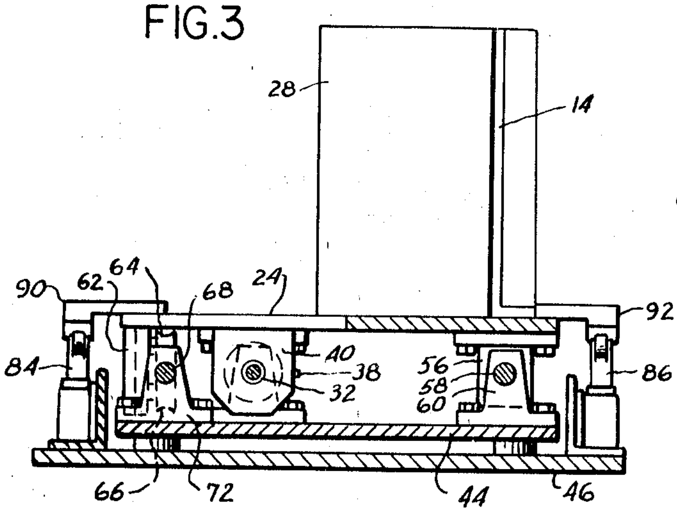
FIG. 3 is a cross-sectional view taken along the line 3—3 of FIG. 1.

This beam scanning is made possible by the optical system illustrated in FIG. 1 from which the basic principles of the invention can be understood. A scanning beam is produced by a cathode-ray tube 10 which is caused to be incident on a first reflecting means in the form of a plane mirror 12, which in turn reflects the incident beam onto a second reflecting means in the form of a plane mirror 14. Mirror 14 in turn redirects the beam through an objective lens system 16 mounted in a lens housing 17 onto the surface of a strip of microfilm 18 mounted on an adjustable film holder 19.

The scanning beam is caused to move in a plane perpendicular to the plane of the drawing, and as it does so, the twice reflected beam scans over one line of film 18 in a similarly perpendicular plane. The transmission of the beam through film 18 is a function of the content of the film. That is, for a dark or opaque portion there will be little or no beam transmission, and for a light or transparent area on the film, there will be significant beam transmission. The fluctuating beam representing the image content of the film passes through a condensing lens 20, and is then incident on a photomultiplier 22. The output of the latter is processed in a manner to be described below to produce an image signal for transmission to a remote receiver.

Mirrors 12 and 14 are fixedly mounted on a movable carriage 24. Upon the completion of scanning of one line on the film, carriage 24 is incrementally moved to a new position by means to be described, and the plane of the beam is repositioned to begin scanning along a new line of the film. In a significant aspect of the invention, the arrangement of the mirrors 12 and 14 converts a relatively gross movement of carriage 24 (and thus mirrors 12 and 14) to produce a relative fine movement of the scanning beam over the surface of the film.

This is illustrated in FIG. 1 in which the middle and two extreme positions of mirrors 12 and 14 are illustrated along with the corresponding positions of the beam incident on the plane of the film. 12A and 14A respectively illustrate the leftmost position of the mirrors, 12B and 14B represent the middle position of the mirrors, and 12C and 14C represent the rightmost mirror position.

A beam A produced by cathode-ray tube 10 is reflected from mirror 12A as ray A'. The latter in turn is reflected from mirror 14A as ray A'' which is incident on the rightmost point on film 16. Similarly beam B from tube 10 is reflected from mirror 12B as ray B' which is reflected from mirror 14B as ray B''. The latter ray is centrally incident on the film. Beam C is reflected from mirror 12A as beam C' which in turn is reflected from mirror 14C as beam C''. The latter beam in turn is incident at the leftmost part on film 18. Thus by moving the mirrors 12 and 14 from between their extreme or "A" and "C" positions, the scanning beam is caused to move transversely across the film. It should be again noted that the amount of movement of the mirrors between the two extreme positions greatly exceeds the resulting movement of the beam across the film.

Carriage 24 and thus mirrors 12 and 14 are moved in incremental steps between their two end positions to cause the beam to incrementally move across the film. Each incremental movement of the carriage produces a new line of scanning; the extent of each incremental step of the carriage produces a corresponding although much smaller incremental movement of the scanning beam over the film.

Mirrors 12 and 14 are respectively carried in mirror supports 26 and 28 which are both fixedly mounted on the upper surface of carriage 24. The mirror supports and the mirrors are spaced from one another and oriented with respect to the longitundinal axis of the carriage so that the beams incident thereon are reflected in the manner described above. In the embodiment herein described mirrors 12 and 14 are arranged at an angle of approximately 45° with respect to the transverse axis of the carriage, although this angle may be varied to meet specific requirements of the system.

Figure 6:
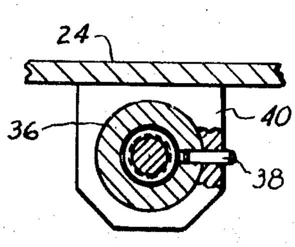
FIG. 6 is a cross-sectional view taken across the line 6—6 of FIG. 5.
Figure 5:
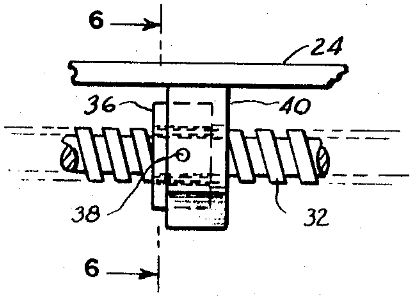
FIG. 5 is a fragmentary view on an enlarged scale of a portion of the carriage drive of the transmitter.
Figure 8:
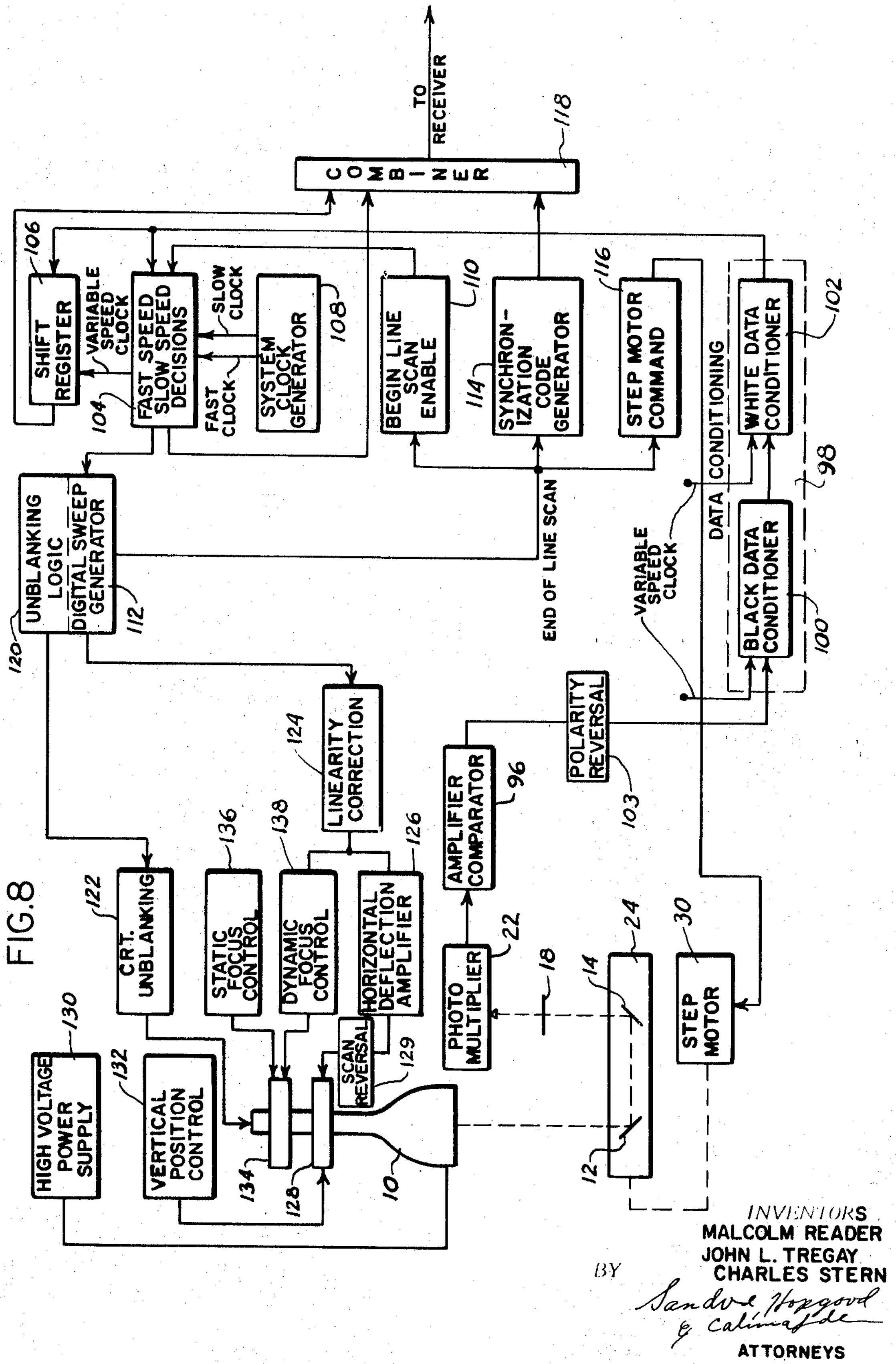
FIG. 8 is a schematic diagram in block form of the electronic and carriage control portion of the transmitter.

Incremental movement is imparted to carriage 24 in response to the operation of a step motor 30 which is actuated in a manner to be described below. The stepwise angular motion of the output shaft of motor 30 is transmitted to a lead screw 32 by means of a belt 34. As seen best in FIGS. 5 and 6, a threaded bushing 36 is threadably engaged on lead screw 32 and is caused to move transversely upon the rotation of lead screw 32. A pin 38 is secured to and extends radially from bushing 36 and passes through an opening formed in a block 40 which is in turn secured to the underside of carriage 24. As step motor 30 undergoes an incremental angular or rotational motion, bushing 36 undergoes a corresponding incremental transverse motion, the latter motion being imparted to block 40 and thus to carriage 24 by means of the engagement of pin 38 and block 40. This in turn causes the relative position of mirrors 12 and 14 with respect to the cathode-ray beam and the film to be incrementally varied whereby the scanning beam in moved to a new line on the film all as described above.

Motor 30 is supported by a bracket 42 mounted on a support plate 44, which in turn is carried on a baseplate 46 and spaced therefrom by spacing members 48. Also mounted on support plate 44 are bearings 50 and 52 in which the two ends of lead screw 32 are received. Carriage 24 also carries a pair of bushings 54 and 56 on its underside which travel along a shaft 58 supported at its ends by supports 60 and 62 mounted on plate 44.

Figure 4:
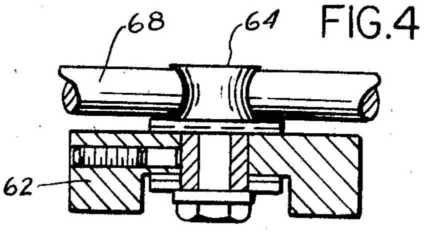
FIG. 4 is a cross-sectional view taken along the line 4—4 of FIG. 2.

As seen best in FIG. 4, a bracket 62 is mounted on the underside of carriage 24 and carries a pair of vertically spaced rollers 64 and 66. These rollers travel along a shaft 68 whose ends are supported in supports 70 and 72 mounted on plate 44. The traveling of carriage 24 along the forward and rear shafts 68 and 58 provides increased support and balance for the carriage.

Cathode-ray tube 10 is mounted within a suitable housing 74 mounted on baseplate 46, and the condensing lens 20 and photomultiplier 22 are housed within a sealed housing 76 also mounted on plate 46 to the side of tube housing 74. Film holder 19 is mounted in the space between housing 76 and lens housing 17.

A series of microswitches 78–84 are positioned along one side of carriage 24 and an additional microswitch 86 is positioned along the other side of the carriage. The carriage carries a pair of projecting switch-engaging members 88 and 90 on one side and a similar switch-engaging member 92 on its other side.

At the beginning of a scan operation, step motor 30 is actuated to cause lateral incremental movement of carriage 24 in the manner described above. At that time member 92 engages the cam or rocker arm associated with microswitch 86 to actuate the latter. This results in the transmission of a start scan signal to the receiver to inform the receiver that it is to receive a new image transmission. Mirrors 12 and 14 are at this time in the "A" position in FIG. 1.

Figure 7:
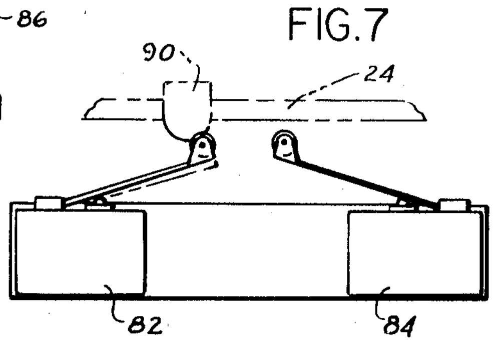
FIG. 7 is a simplified fragmentary view illustrating one of the carriage control switches of the transmitter.

Carriage 24 is then incrementally moved along by the succeeding operations of step motor 30 until member 90 engages the rocker arm of switch 82 as seen in FIG. 7. At this time the mirrors are at their "C" position in FIG. 1 indicating that all lines on the film have been scanned. The actuation of switch 82 actuates motor 30 to cause the carriage to be returned to the left as viewed in FIG. 1 toward its starting position, until member 88 engages the rocker arm of switch 80 causing motor 30 to be deenergized. The system is now ready for the insertion of a new strip of microfilm for subsequent transmission.

In the event the engagement of member 90 and switch 82 is ineffective to reverse the carriage, the carriage will continue to move toward the right in FIG. 1 until member 90 engages the rocker arm of switch 84. When the latter is actuated the system is caused to be shut down, and an indicating light (not shown) may be energized to indicate a faulty operation of the carriage control apparatus. Similarly should switch 80 be ineffectual to stop the carriage upon its return, the carriage will continue to move toward the left until member 88 engages the rocker arm of switch 78, to actuate that switch and turn off the system as in the case of the actuation of switch 84.

FIG. 7 illustrates the electronics portion of the system which processes the analog image signals obtained from photomultiplier 22 for transmission to the receiver, as well as the step motor control circuitry. As the circuitry is substantially similar to that disclosed in a copending application Ser. No., entitled Adaptive Multiple Speed Facsimile Transmitting System, it will only be described herein in relatively brief terms.

The output from photomultiplier 22 is applied to the input of amplifier–comparator 96 in which the level of the signal is compared to a threshold or reference level. Signals above that level are considered to represent white data, and signals below that level are considered to represent black data. Amplifier comparator 96 thus produces output signals at one of two levels. Those signals are coupled to a black-white data conditioner 98 which contains in series a black data conditioner 100 and a white data conditioner 102. If desired, to permit image transmission from both positive and negative films, a polarity reverser 103 may be interposed between amplifier-comparator 96 and data conditioner 98. Reverser 103, when selectively operated is effective to reverse the polarity of the image data output signals of comparator 96.

As described more completely in said copending application, data conditioner 98 operates to expand black and white data signals of a certain minimum duration to a basic quantizing unit of duration defined as an element. The processed data signal output of data conditioner 98 is applied to a fast-slow decision circuit 104 and to a data storing shift register 106. Circuit 104 also receives fast and slow clock signals from a system clock generator 108.

Circuit 104 analyses the image signal data and selects either the fast or slow clock for application to shift register 106. The selected clock, to wit, fast or slow, causes the stored signal data in shift register 106 to be transferred or read out and transmitted to the receiver at the selected fast or slow rate. As more completely described in said copending application, upon the receipt of a predetermined number of consecutive white data elements at circuit 104, the decision is made to apply the fast clock to register 106. Upon the receipt of the next black data element, the clock output of circuit 104 is shifted to the slow clock rate. In addition when a new line scan signal is obtained from enable circuit 110, circuit 104 unconditionally supplies the fast clock signal to register 106 and continues to do so until circuit 104 receives a black data signal.

The clock signal selected at circuit 104 is also applied to a digital sweep generator 112, which counts the number of input clock signals corresponding to the number of processed data signals. Each line of scan produces a known number e.g., 1,024, of such data elements. Once that number is counted, an end-of-line signal is produced by generator 112 which is applied to enable circuit 110, a synchronizer circuit code generator 114, and a step motor command circuit 116. The latter thereupon produces an actuating signal for step motor 30, which as described above, is transformed to an incremental transverse movement of carriage 24 by means of lead screw 32.

Upon the receipt of the end-of-line signal, code generator 114 produces a corresponding code signal which along with the data signal output signal of shift register 106 and the fast-slow select signal produced at circuit 104, is combined in a combiner 118 for transmission to the receiver. The end-of-line signal is also applied to an unblanking logic circuit 120 which thereupon supplies an appropriate signal to an unblanking circuit 122.

Also as more completely described in said copending application, digital sweep generator 112 includes circuitry for producing a staircase waveform signal at a rate of whichever clock, i.e., fast or slow, is received from circuit 104. That signal is first applied to a linearity control circuit 124 and from there to the horizontal deflection amplifier 126 and to the horizontal deflection coil 128 of tube 10. In this manner the rate at which the beam is swept or scanned across the face of the tube, and thus across the film, also corresponds to the nature of the scanned data. A scan reversal switch 129 may be interposed between amplifier 126 and deflection coil 128, to reverse the direction of beam scanning, to wit, from right-to-left rather than left-to-right. This permits image scanning independent of the orientation of the film in film holder 19.

Tube 10 receives its operating voltages from a power supply 130 and the vertical position of the horizontally scanning beam is established by a signal produced by a vertical position control circuit 132 and applied to beam deflection coil 128. Focusing of the beam is controlled by signals applied to focusing coil 134 from static focus control circuit 136 and dynamic focus control circuit 138, the latter being controlled by a signal supplied thereto from linearity correction circuit 124.

The image transmitter of the invention thus provides a practical and reliable means for scanning reduced sized images such as microfilm positives or negatives by an improved scanning system which permits the scanning beam to be moved over the surface of the film in precisely controlled, small increments in the order of 0.04 mm. The fine incremental beam motion of the beam is controlled by the relatively gross movement of a carriage which can be controlled with high precision.

The system is thus extremely useful in transmitting images from reduced image sources in which beam scanning has heretofore been difficult and very costly as a result of the finite spot size of the scanning beam.

While only a single embodiment of the invention has been herein described, it is to be understood that variations may be made therein without necessarily departing from the spirit and scope of the invention.

We claim:

1. Apparatus for transmitting information from a reduced size medium such as microfilm or the like, said apparatus comprising means for supporting film in a scanning plane, a fixed source of a scanning beam a carriage, first nonrotatable reflecting means mounted on said carriage in optical communication with said beam source, second nonrotatable reflecting means mounted on said carriage and spaced at a fixed distance from and in optical communication with and nonparallel to said first reflecting means, a fixed lens mounted near said film supporting means and spaced from said carriage interposed between said second reflecting means and the film for producing from the beam incident thereon a spot that is illuminated onto the plane of the film, and means including means for incrementally moving said carriage for incrementally varying the relative position of said first and second reflecting means with respect to said beam source and said film while maintaining said first and second reflecting means at said fixed distance from one another, thereby to incrementally move said scanning beam across the plane of the film, whereby the incremental motion and size of said spot at the film are respectively less than the incremental motion of said reflecting means and the spot size of said beam at said beam source.

2. The apparatus of claim 1, in which said first reflecting means comprises means for receiving the beam from said beam source and redirecting the scanning beam onto said second reflecting means, said second reflecting means comprising means for redirecting the scanning beam onto the plane of the film.

3. The apparatus of claim 2, in which said first reflecting means is oriented at a predetermined angle with respect to the axis of said scanning beam, and said second reflecting beam is oriented at said predetermined angle with respect to the scanning reflected scanning beam incident thereon.

4. The apparatus of claim 1, in which said first reflecting means is oriented at a predetermined acute angle with respect to the axis of said scanning beam, and said second reflecting beam is oriented at said predetermined angle with respect to the scanning reflected scanning beam incident thereon and to the plane of the film.

5. The apparatus of claim 4, further comprising means for producing a step signal upon the completion of scanning along one line of the film, said incremental position varying means being responsive to said step signal to laterally move said first and second reflecting means, thereby to reposition said scanning beam to initiate scanning of the film along a line immediately succeeding said one line.

6. The apparatus of claim 1, further comprising means for producing a step signal upon the completion of scanning along one line of the film, said incremental position varying means being responsive to said step signal to laterally move said carriage and said first and second reflecting means, thereby to reposition said scanning beam to initiate scanning of the film along a line immediately succeeding said one line.

7. The apparatus of claim 6, in which said carriage moving means comprises a step motor actuated upon the receipt of each of said step signals, and means coupled to said carriage and said step motor for causing an incremental lateral shift of the former upon each operation of the latter.

* * * * *